US010664805B2

(12) United States Patent
Dey et al.

(10) Patent No.: US 10,664,805 B2
(45) Date of Patent: May 26, 2020

(54) SYSTEM, METHOD AND COMPUTER PROGRAM PRODUCT FOR RESUME REARRANGEMENT

(71) Applicant: International Business Machines Corporation, Armonk, NY (US)

(72) Inventors: Kuntal Dey, New Delhi (IN); Seema Nagar, Bangalore (IN); Sudhanshu Shekhar Singh, New Delhi (IN); Roman Vaculin, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 278 days.

(21) Appl. No.: 15/401,846

(22) Filed: Jan. 9, 2017

(65) Prior Publication Data
US 2018/0196783 A1 Jul. 12, 2018

(51) Int. Cl.
*G06F 17/00* (2019.01)
*G06Q 10/10* (2012.01)
*G06F 3/01* (2006.01)

(52) U.S. Cl.
CPC ......... *G06Q 10/1053* (2013.01); *G06F 3/013* (2013.01)

(58) Field of Classification Search
CPC ......... G06F 17/30126; G06F 17/30699; G06F 3/04842
See application file for complete search history.

(56) References Cited

U.S. PATENT DOCUMENTS

| 8,930,398 B1* | 1/2015 | Kishore | G06F 16/3329 |
| | | | 707/780 |
| 2004/0070593 A1* | 4/2004 | Neely | G06F 17/30849 |
| | | | 715/716 |
| 2007/0074102 A1* | 3/2007 | Kraft | G06F 16/951 |
| | | | 715/206 |
| 2009/0300042 A1* | 12/2009 | Lloyd | G06F 17/30728 |
| 2011/0106831 A1* | 5/2011 | Zarzar Charur | G06F 17/3064 |
| | | | 707/767 |
| 2012/0166922 A1* | 6/2012 | Rolles | G06F 17/3089 |
| | | | 715/202 |
| 2013/0307764 A1 | 11/2013 | Denker et al. | |

(Continued)

FOREIGN PATENT DOCUMENTS

WO   WO 2015/164209 A1   10/2015

OTHER PUBLICATIONS

Mel, et al. "The NIST Definition of Cloud Computing". Recommendations of the National Institute of Standards and Technology. Nov. 16, 2015.

*Primary Examiner* — Andrew T McIntosh
(74) *Attorney, Agent, or Firm* — Anthony Curro, Esq.; McGinn I.P. Law Group, PLLC.

(57) ABSTRACT

A resume rearrangement method, system, and computer program product, includes linking content segments of a resume including key terms with each other based on a pairwise similarity score between the key terms of the content segments, identifying an interest segment within the resume that draws interest from a current reader, and displaying a summary for the current reader including the interest segment that has drawn the interest of the current reader and a reference to at least one other segment that is linked with the interest segment.

17 Claims, 5 Drawing Sheets

(56) References Cited

U.S. PATENT DOCUMENTS

2013/0311924 A1* 11/2013 Denker .................. G06F 3/013
715/771
2014/0223462 A1 8/2014 Aimone et al.
2016/0019464 A1 1/2016 Madhavan et al.

* cited by examiner

SYSTEM, METHOD AND COMPUTER PROGRAM PRODUCT FOR RESUME REARRANGEMENT

BACKGROUND

The present invention relates generally to a resume rearrangement method, and more particularly, but not by way of limitation, to a system, method, and computer program product for dynamically rearranging (reorganizing) a version of a given resume.

Conventionally, resumes (e.g., curriculum vitae) are static documents that are reviewed by hiring departments or hiring managers. Typically, the hiring manager is reviewing a resume for particular skills or experience that are spread out in different sections of the resume such as in a project section, a prior experience section, an education section, etc. Therefore, the time to review a resume is greatly increased by requiring that the hiring manager review the entire document to find each relevant section for the job.

That is, there is a problem in the conventional resume display and review techniques that the resumes are static documents and require long review processes to sift through each section in order to find the job-relevant skills.

SUMMARY

In an exemplary embodiment, the present invention can provide a computer-implemented resume rearrangement method, the method including linking content segments of a resume including key terms with each other based on a pairwise similarity score between the key terms of the content segments, identifying an interest segment within the resume that draw interest from a current reader, and displaying a summary for the current reader including the interest segment that has drawn the interest of the current reader and a reference to other segments that are linked with the interest segment.

One or more other exemplary embodiments include a computer program product and a system.

Other details and embodiments of the invention will be described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which.

DETAILED DESCRIPTION

Figure 1:
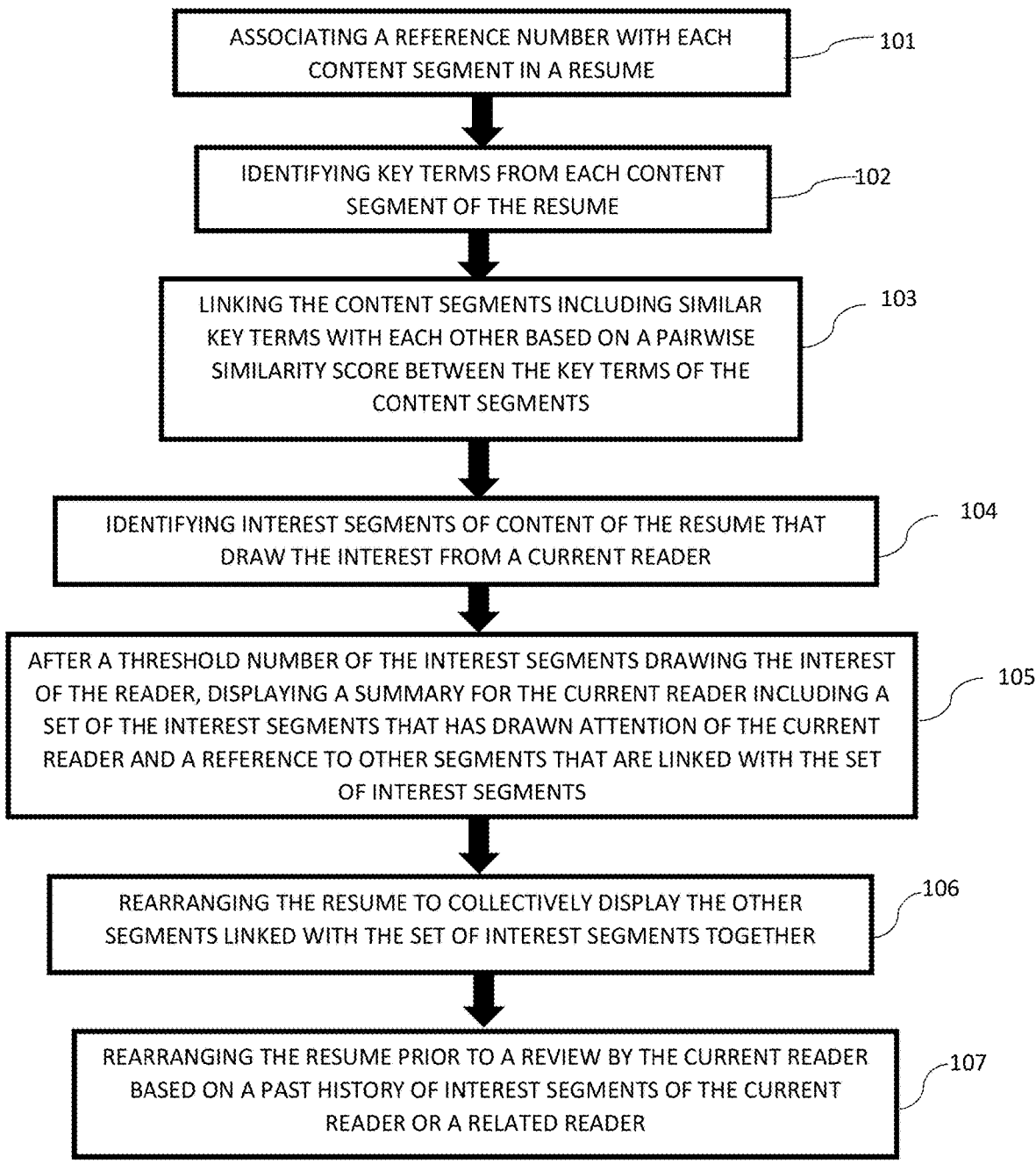
FIG. 1 exemplarily shows a high-level flow chart for a resume rearrangement method 100 according to an embodiment of the present invention.

The invention will now be described with reference to FIGS. 1-5, in which like reference numerals refer to like parts throughout. It is emphasized that, according to common practice, the various features of the drawing are not necessarily to scale. On the contrary, the dimensions of the various features can be arbitrarily expanded or reduced for clarity.

By way of introduction of the example depicted in FIG. 1, an embodiment of a resume rearrangement method 100 according to the present invention can include various steps for dynamically rearranging (e.g., reorganizing) a digital version of a given resume to thereby present the interesting segments of the resume together to a given reader (e.g., recruiter, human resources staff, etc.), where the interest in the different parts (e.g., content segments) of the resume is inferred by analyzing an eye gaze movement of the reader when the reader reviews the resume. By way of introduction of the example depicted in FIG. 2, one or more computers of a computer system 12 according to an embodiment of the present invention can include a memory 28 having instructions stored in a storage system to perform the steps of FIG. 1.

Thus, a resume rearrangement method 100 according to an embodiment of the present invention may act in a more sophisticated, useful and cognitive manner, giving the impression of cognitive mental abilities and processes related to knowledge, attention, memory, judgment and evaluation, reasoning, and advanced computation. In other words, a "cognitive" system can be said to be one that possesses macro-scale properties—perception, goal-oriented behavior, learning/memory and actions generally recognized as cognitive.

Although one or more embodiments may be implemented in a cloud environment 50 (see e.g., FIG. 3), it is nonetheless understood that the present invention can be implemented outside of the cloud environment.

In the description herein, the term "segments" refers to a portion of a resume such as the education, prior job experience, project experience, etc. The "segments" can include the entire section such as the entire job experience of the applicant, or subsections of the segments such as only the graduate level education and not the undergraduate level education, etc.

Referring now to FIG. 1, in step 101, a reference number is associated with each content segment of the resume (e.g., such as an integer serial number). A content segment can be identified, for example, by natural language processing (NLP) techniques, by an input given using appropriate resume composing software, etc. where a content segment gets defined by an academic course undertaken as a student, a project contributed to as an employee, a level of education, etc. by the application. In other words, each segment of the resume is associated with a reference number in a pre-processing step.

In step 102, key terms from each content segment of the resume are identified. For example, the key terms from each content segment of the resume are identified by using a knowledge base(s), NLP techniques) (such as LSI/LDA, TF-IDF) etc., where key terms are defined using a job role, a skill set, and domain-specific knowledge related concepts. In some embodiments, the key terms can be identified in relation to the position (e.g., job) for which the applicant is applying. For example, a first-year law associate position focusing in contract drafting would require key terms such as "Juris Doctor Degree", "Grade Point Average", "Contracts Course", etc.

In step 103, the content segments which have similar key terms are linked with each other based on a pairwise similarity score between the key terms of the content segments. In other words, segments within the resume that are related to each other are linked with each other based on the similarity between the segments being above a predefined threshold (e.g., the pairwise similarity score being greater than a threshold score). That is, in step 103, the similarity score of a given pair(s) of resume content segments is computed, where the computation spans over the key terms of each segment of the segment-pair, using mechanisms such as word vectors, document co-occurrences and cosine similarities. It is noted that the content segments linked with each other are linked with the reference number such that a list of the reference numbers of each section are identified. In other words, a list of all of the linked segments with each other is made up of the reference number(s) such that the method can later call forth the segments based on the reference number associated with the segments.

For example, the resume can include a project in which the applicant used computational fluid dynamics (CFD) models to design an aircraft wing, a project in which the applicant designed a fuselage of an aircraft, a project in which the applicant was the lead designer of the piston firing rates for an automobile engine, an aircraft engineering course, and a mechanical dynamics course. In step 103, the aircraft wing design project, the fuselage design project, and the aircraft engineering course are each linked with each other based on the pairwise similarity score between key terms being greater than a threshold value (e.g., aircraft and engineering in each segment are the key terms and similar to each other). Likewise, the mechanical dynamics course and the automobile engine design are linked with each other based on key terms within the description being similar (e.g., piston design is related to the mechanical dynamics field of engineering).

In step 103, the pairwise similarity score of each given pair(s) (or plurality of segments paired with each other) of the resume content segments is stored, such as in form of a square matrix, where the $(I,j)^{th}$ element contains a similarity score between the $i^{th}$ row and $j^{th}$ column of the matrix, computed via any mechanism such as word vectors, document co-occurrences and cosine similarities).

It is noted that steps 101 to 103 are so-called "pre-processing" steps in which the resume is processed prior to a reviewer viewing the resume. The pre-processing is preferably performed on a back end of a system, for example such that the similarity scores and reference numbers preferably are determined and assigned before the viewer views the resume.

In step 104, interest segment(s) of content of the resume that draw the interest from a current reader are identified via eye tracking, cursor tracking, or the like. For example, if the current reader is identified to be gazing at "project four", project four is identified as an interest segment of the content. Likewise, if the cursor in the software is following along with a description of "prior work experience", the prior work experience is identified as an interest segment.

In step 105, after a threshold number of the interest segments drawing the interest of the reader have been identified, displaying a summary for the current reader is performed including an interest segment (or set of interest segments) that has drawn the attention of the current reader and a reference to other segment(s) that are linked (e.g., based on the pairwise similarity score) with the interest segments as identified in step 104. For example, if the reference number(s) for project four, project six, the graduate level education, and grade point average are each linked with the reference number of project one, which is identified as an interest segment, a summary is displayed showing that project one is an interest segment and that project four, project six, the graduate level education, and the grade point average are linked with the interest segment.

That is, in step 105, displayed is a summary on the screen of the browsing software of the resume, triggered after a threshold number of segments (e.g., a fraction of the total number of segments), showing a reference to a set of segments that has drawn attention of the reader, and references to other segments that have similar content.

In step 106, the content of the resume is rearranged to collectively display the other segments associated with the interest segment (set of interest segments) together in one location on the display. The rearrangement of the resume can be automatically performed or optionally (manually) done based on a user choice after seeing the summary from step 105. For example, a choice (manual) input from the current reader on whether they want to rearrange the resume to see the interest segment and see together (collocated next to each other) the segments that will be interesting to them based upon their observed cognitive behavior (e.g., the other segments that are linked with the interest segment).

The location of the rearranged content can be in the margins of the resume, can replace the display of the resume, or can include a pop-up window that displays the segments together. In each rearrangement, the segments linked with each other are collocated next to each other. The rearranged segments are preferably arranged such that segment of interest is first and then each segment is displayed in descending order according to the pairwise similarity score.

In some embodiments, the resume can be regenerated to remove each segment that is not relevant to the segment of interest.

In some embodiments, it is common for a current reader to review several resumes at a same time for the same position. Therefore, in step 107, after the pre-processing of each resume in steps 101-103 and after segments of interest are learned from previous resumes, the resume can be rearranged prior to a review by the current reader based on the past history of interest segments (e.g., as identified in step 104 from past resumes) or based on related readers interest segments (e.g., a staff member reviewing resumes for the same position). As such, the system can "learn" a current reader's preferences based on the current readers previous indicating of interest segments. Alternatively or additionally, the system may learn preferences from readers other than the current reader, if the current reader has a past history. Therefore, the current reader can initially review a rearranged version of a new resume for a same position. Thus, the time to review a plurality of resumes can be greatly reduced based on the resume's being rearranged apriori.

Figure 2:
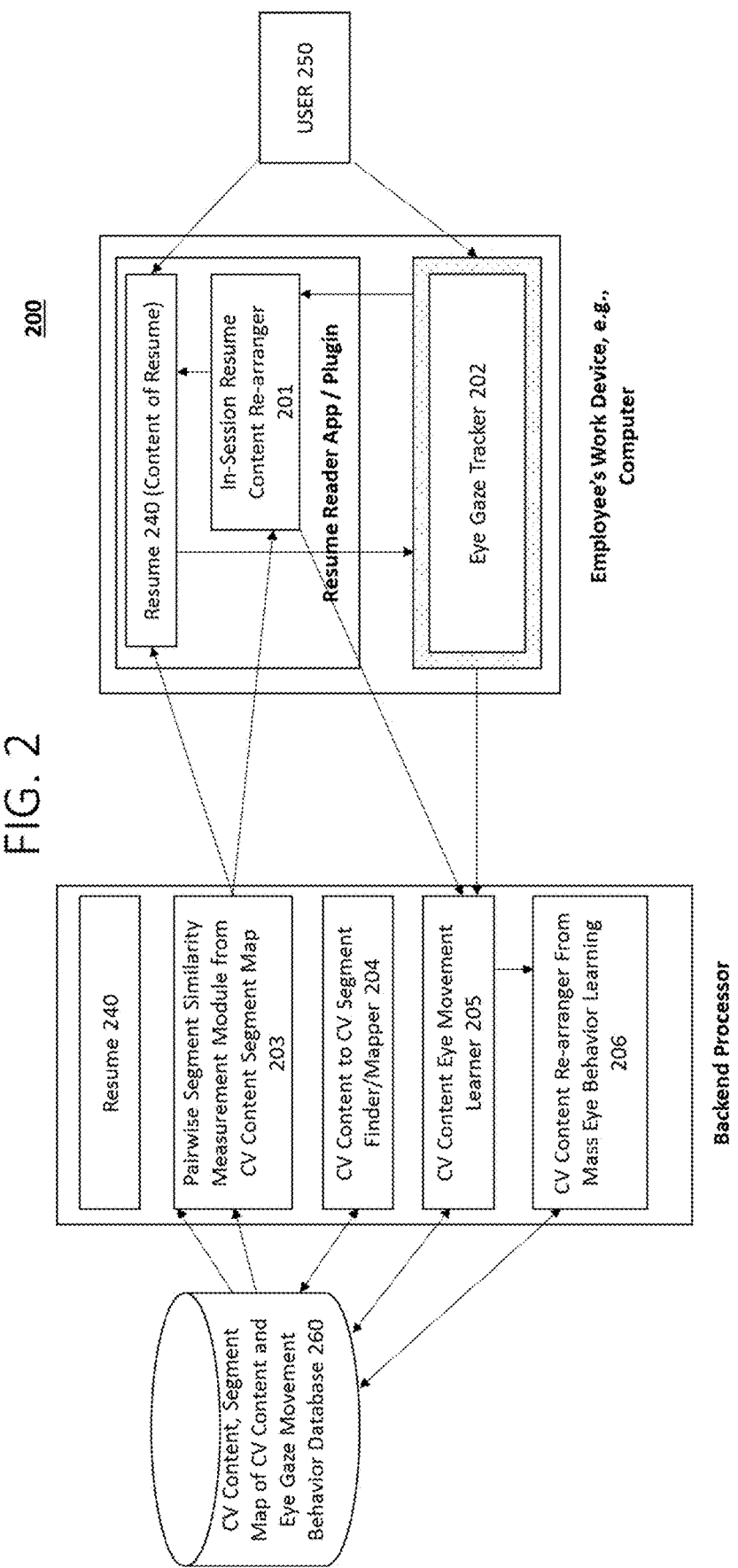
FIG. 2 exemplarily depicts an exemplary system 200 diagram according to an embodiment of the present invention.

FIG. 2 exemplarily depicts a system 200 that can execute the method 100. It is noted that "CV" and "Resume" are interchangeably used. As shown in FIG. 2, the CV content to CV segment finder/mapper 204 associates reference number with each content segment of the resume 240 (e.g., such as an integer serial number) and identifies key words of the resume. The pairwise segment similarity measure module from CV content segment map 203 links the content segments which have similar key terms with each other based on a pairwise similarity score between the key terms of the content segments.

The eye gaze tracker 202 tracks the eye gaze of the user 250 to identify interest segments of content of the resume that draw the interest from a current reader. The in-session resume content re-arranger 201 first displays a summary for the current reader including an interest segment (or set of interest segments) that has drawn the attention of the current reader and a reference to other segments that are linked (based on the pairwise similarity score) with the interest segments. Alternatively, the in-session resume content re-arranger 201 rearranges the content of the resume to collectively display the other segments associated with the interest segment (set of interest segments) together in one location on the display.

The CV content eye movement learner 205 learns a past history of eye gazes of the user 250 to identify segments of interest and the CV content re-arranger from mass eye behavior learning 206 can, after the pre-processing of each resume and after segments of interest are learned from previous resumes, rearrange the resume prior to a review by the current reader based on the past history of interest segments or based on related readers interest segments.

Thus, the method 100 and the system 200 can dynamically rearrange (reorganize) a digital version of a given resume opened under a reading platform (or a web browser with an appropriate plugin), to thereby present the interesting parts of the resume together to a given reader (e.g., recruiter etc.), where the interest in the different parts (e.g., content segments) of the resume are inferred by analyzing the eye gaze movement of the reader when the user reads the resume. Also, within a reading session, the content rearrangement can be triggered by measuring/monitoring the cognitive attention of the reader to the resume over some time and performed by bringing the similar content of the resume together (subject to user permission). Or, in an offline embodiment, the resume can be rearranged via analysis of mass reading behavior of a given resume.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
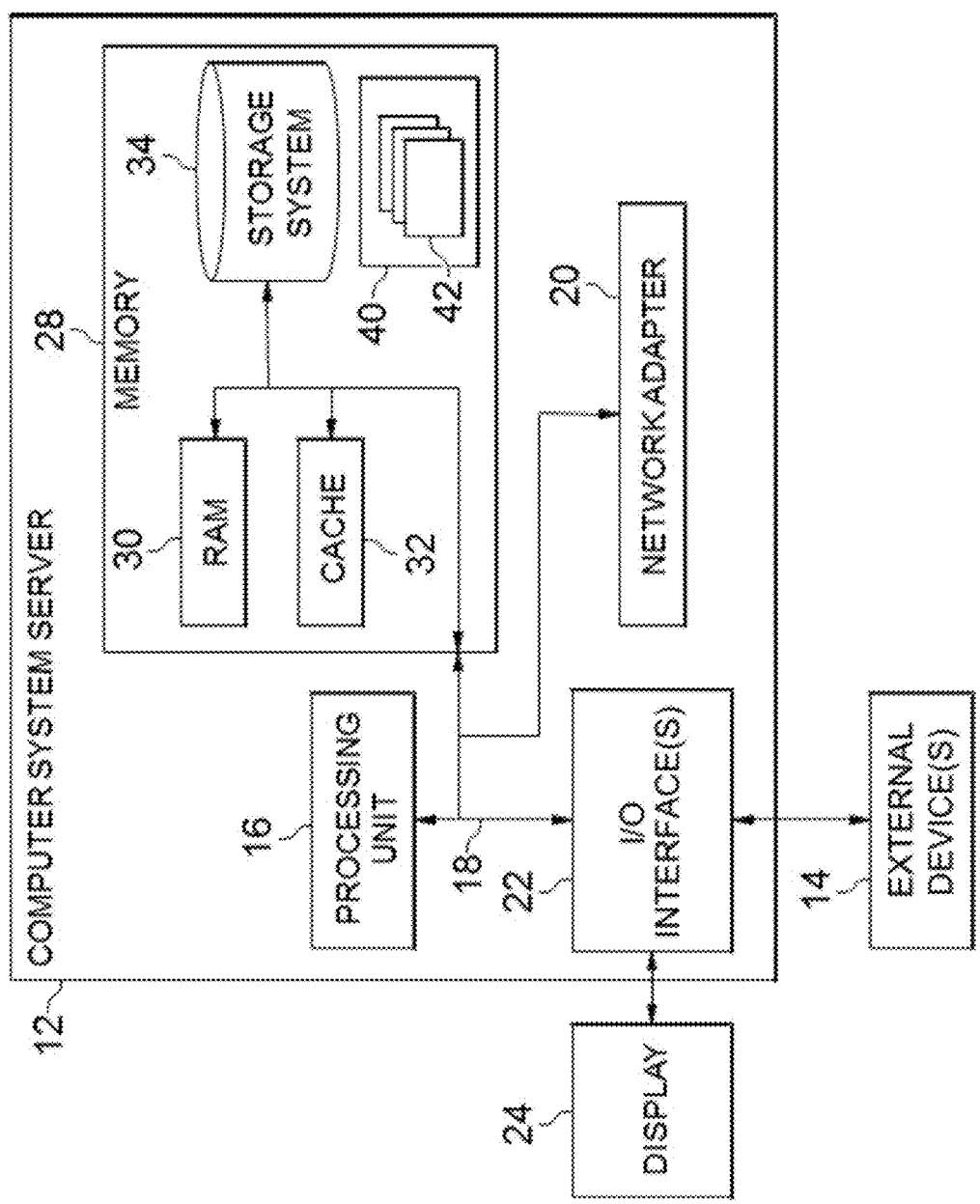
FIG. 3 depicts a cloud-computing node 10 according to an embodiment of the present invention.

Referring now to FIG. 3, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits.

Referring now to FIG. 3, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 4:
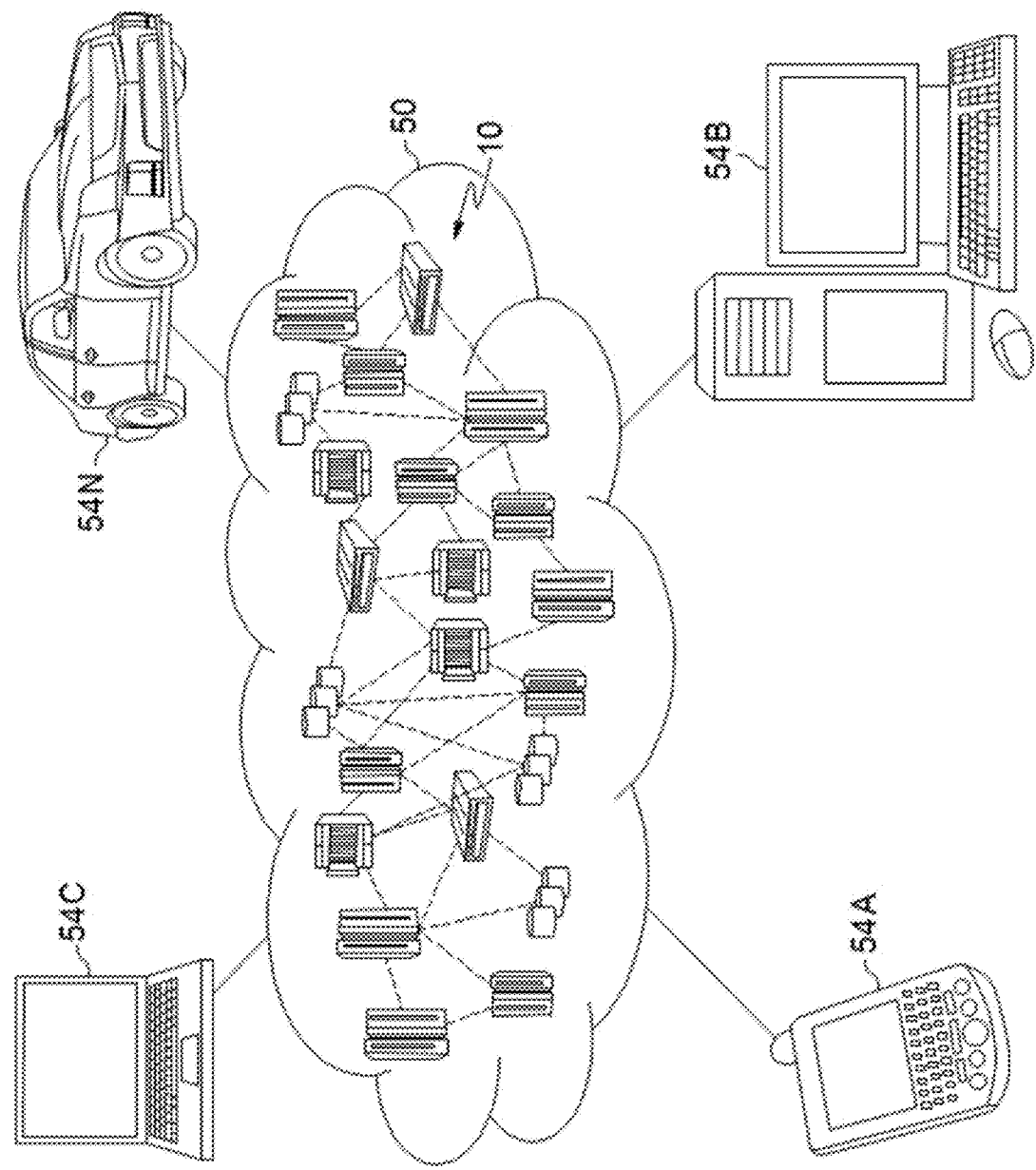
FIG. 4 depicts a cloud-computing environment 50 according to an embodiment of the present invention.

Referring now to FIG. 4, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 4 are intended to be illustrative only and that computing nodes 10 and cloud computing environment 50 can communicate with any type of computerized circuit over any type of network and/or network addressable connection (e.g., using a web browser).

Figure 5:
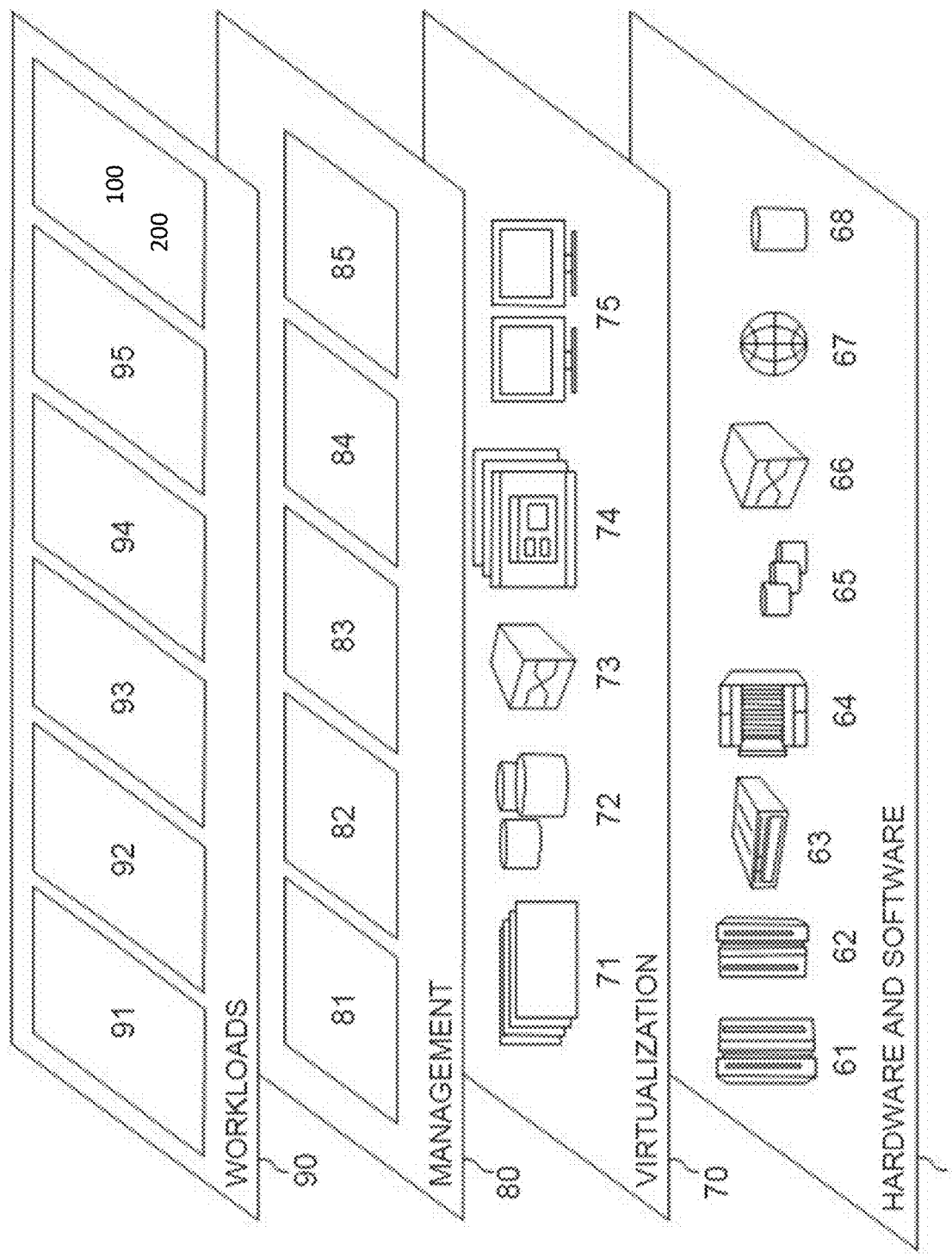
FIG. 5 depicts abstraction model layers according to an embodiment of the present invention.

Referring now to FIG. 5, an exemplary set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and resume rearrangement method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented resume rearrangement method, the method comprising:
   linking content segments of different sections of a resume including key terms with each other based on a pairwise similarity score between the key terms of the content segments;
   identifying a plurality of interest segments within the resume that draws interest from a current reader until a threshold number of interest segments are identified based on a factor combining:
      a cognitive attention of the current reader to content segments across the different sections of the resume over a predetermined time of review;
      a cursor movement of the current reader; and
      a gaze factor measuring a gaze time of the current reader corresponding to each of the content segments, a longest time of the gaze time indicating a greatest interest segment within the resume; and
   displaying a summary separate from the resume for the current reader, the summary including the interest segment that has drawn the interest of the current reader and a display of at least one other segment of the content segments of the different sections that is linked with the interest segment based on the pairwise similarity score between the key terms of the interest segment and the one other segment, the displaying rearranging the interest segments in the summary such that the interest segments are displayed together,
   wherein the pairwise similarity score is based on the content segments of different sections being related to each other and linked with each other according to the similarity being above a predefined threshold,
   further comprising:
      associating a reference number with each content segment in the resume; and
      identifying the key terms from each content segment of the resume,
   wherein the linking links the reference number for the interest segment with each reference number for the at least one other segment including key terms similar to the key terms of the interest segment, and
   wherein the pairwise similarity scores are stored in a database in a square matrix where an $(I,j)^{th}$ element contains a similarity score between an $i^{th}$ row and an $j^{th}$ column of the matrix.

2. The computer-implemented method of claim 1, further comprising rearranging a display of the resume to collectively display together the another segment linked with the interest segment.

3. The computer-implemented method of claim 1, wherein the displaying displays the summary after a threshold number of interest segments drawing the interest of the reader have been identified.

4. The computer-implemented method of claim 3, wherein the displaying displays the summary for the interest segment having a highest interest to the current reader.

5. The computer-implemented method of claim 2, wherein the rearranging removes the segments that are not linked with the interest segment from the display.

6. The computer-implemented method of claim 1, further comprising rearranging the resume prior to a review by the current reader based on a past history of identified interest segments by the identifying for the current reader or a related reader on a different resume to collectively display together the at least one other segment linked with the interest segment.

7. The computer-implemented method of claim 1, wherein, if a prior history of identified interest segments for a different resume for the current reader exists, skipping the displaying the summary and instead automatically rearranging a display of the resume prior to a review by the current reader to collectively display together the at least one other segment linked with the interest segment.

8. The computer-implemented method of claim 1, embodied in a cloud-computing environment.

9. The computer-implemented method of claim 1, wherein the displaying moves each of the interest segments within the resume that draws interest from the current reader together in the summary.

10. A computer program product for a resume rearrangement method, the computer program product comprising a computer readable storage medium having program instructions embodied therewith, the program instructions executable by a computer to cause the computer to perform:
- linking content segments of different sections of a resume including key terms with each other based on a pairwise similarity score between the key terms of the content segments;
- identifying a plurality of interest segments within the resume that draws interest from a current reader until a threshold number of interest segments are identified based on a factor combining:
  - a cognitive attention of the current reader to content segments across the different sections of the resume over a predetermined time of review;
  - a cursor movement of the current reader; and
  - a gaze factor measuring a gaze time of the current reader corresponding to each of the content segments, a longest time of the gaze time indicating a greatest interest segment within the resume; and
- displaying a summary separate from the resume for the current reader, the summary including the interest segment that has drawn the interest of the current reader and a display of at least one other segment of the content segments of the different sections that is linked with the interest segment based on the pairwise similarity score between the key terms of the interest segment and the one other segment, the displaying rearranging the interest segments in the summary such that the interest segments are displayed together,
wherein the pairwise similarity score is based on the content segments of different sections being related to each other and linked with each other according to the similarity being above a predefined threshold,
further comprising:
- associating a reference number with each content segment in the resume; and
- identifying the key terms from each content segment of the resume,
wherein the linking links the reference number for the interest segment with each reference number for the at least one other segment including key terms similar to the key terms of the interest segment, and
wherein the pairwise similarity scores are stored in a database in a square matrix where an $(I,j)^{th}$ element contains a similarity score between an $i^{th}$ row and an $j^{th}$ column of the matrix.

11. The computer program product of claim 10, further comprising rearranging a display of the resume to collectively display together the at least one other segment linked with the interest segment.

12. The computer program product of claim 10, wherein the displaying displays the summary after a threshold number of interest segments drawing the interest of the reader have been identified.

13. The computer program product of claim 12, wherein the displaying displays the summary for the interest segment having a highest interest to the current reader.

14. The computer program product of claim 11, wherein the rearranging removes the segments that are not linked with the interest segment from the display.

15. A resume rearrangement method system, said system comprising:
- a processor, and
- a memory, the memory storing instructions to cause the processor to perform:
  - linking content segments of different sections of a resume including key terms with each other based on a pairwise similarity score between the key terms of the content segments;
  - identifying a plurality of interest segments within the resume that draws interest from a current reader until a threshold number of interest segments are identified based on a factor combining:
    - a cognitive attention of the current reader to content segments across the different sections of the resume over a predetermined time of review;
    - a cursor movement of the current reader; and
    - a gaze factor measuring a gaze time of the current reader corresponding to each of the content segments, a longest time of the gaze time indicating a greatest interest segment within the resume; and
  - displaying a summary separate from the resume for the current reader, the summary including the interest segment that has drawn the interest of the current reader and a display of at least one other segment of the content segments of the different sections that is linked with the interest segment based on the pairwise similarity score between the key terms of the interest segment and the one other segment, the displaying rearranging the interest segments in the summary such that the interest segments are displayed together,
wherein the pairwise similarity score is based on the content segments of different sections being related to each other and linked with each other according to the similarity being above a predefined threshold,
further comprising:
- associating a reference number with each content segment in the resume; and
- identifying the key terms from each content segment of the resume,
wherein the linking links the reference number for the interest segment with each reference number for the at least one other segment including key terms similar to the key terms of the interest segment, and
wherein the pairwise similarity scores are stored in a database in a square matrix where an $(I,j)^{th}$ element contains a similarity score between an $i^{th}$ row and an $j^{th}$ column of the matrix.

16. The system of claim 15, wherein the memory further stores instructions to cause the processor to perform:

rearranging a display of the resume to collectively display the at least one other segment linked with the interest segment together.

17. The system of claim 15, embodied in a cloud-computing environment.

* * * * *